Patented Dec. 9, 1941

2,265,319

UNITED STATES PATENT OFFICE 2,265,319

MANUFACTURE OF DITHIO-BIS-THIAZOLES

Morris G. Shepard, Waterbury, and William E. Messer, Cheshire, Conn., assignors to United States Rubber Company, New York, N. Y., a corporation of New Jersey No Drawing. Application May 11, 1940, Serial No. 334,584

4 Claims. (Cl. 260—306)

This invention relates to the manufacture of dithio bis-thiazoles, also called dithiazyl disulphides.

An object of the invention is to provide a process of making 1,1'-dithio bis-thiazoles, and particularly 1,1'-dithio-bis-benzothiazole, by oxidation in alkaline solution of the corresponding mercaptothiazole, with direct recovery from the solution of the desired dithio bis-thiazole, in substantially quantitative yield, and without the need of adding acid as practiced in the prior known oxidation processes. Other objects will be apparent from the following description.

It has been found that the aforesaid purpose can be accomplished if the mercaptothiazole, in aqueous alkaline solution, is oxidized with nitrogen chloride. Nitrogen chloride in water solutions is stable, when unexposed to sunlight. By its use, there is also provided a resulting oxidation product of excellent quality.

The following example in which the parts are by weight, is given to illustrate a preferred embodiment of the invention:

*Example 1.*—To a solution of 50 parts of chlorine, 56 parts of sodium hydroxide, and 1500 parts of water, is added a solution of 10.7 parts ammonium chloride in 1500 parts of water. The resulting clear water-white solution is added slowly to an agitated solution of 50 parts of commercial 1-mercaptobenzothiazole, 12 parts of sodium hydroxide and 300 parts of water. The resulting slurry of 1,1'-dithio bis-benzothiazole is filtered off, washed thoroughly, and dried. Yield is about 37.5 parts of white crystals, melting at 164–175° C. Analysis: 8.41 percent nitrogen; 38.1 percent sulfur. This yield is about 86% of theory based on the mercaptobenzothiazole content of the commercial starting material.

If the two solutions above are cooled, for example to 5° C. before, but not after, mixing, the yield is increased. The nitrogen chloride solution used above is about saturated; the quantity of nitrogen chloride is not substantially in excess of the stoichiometric equivalent required to remove one hydrogen from each molecule of original thiazole.

It is believed that the following equations show the scheme of reaction:

I. $2NH_4Cl + 7NaOCl \rightarrow NCl_3 + NaNO_3 + 6NaCl + 4H_2O$

II.
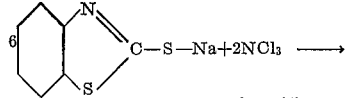
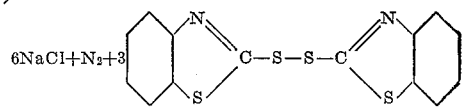

Instead of forming the sodium salt of the mercaptothiazole by solution in sodium hydroxide, other alkalies may be used in dissolving the thiazole, e. g. sodium carbonate, potassium hydroxide, ammonium hydroxide, etc., prior to reacting with nitrogen chloride.

The process may be applied to the oxidation of other mercaptothiazoles, e. g. 1-mercapto tolyl thiazole, 1-mercapto alkyl thiazole, 1-mercapto chlor benzothiazole, 1-mercapto nitro-benzothiazole, 1-mercapto naphtho-thiazole, etc.

Having thus described our invention, what we claim and desire to protect by Letters Patent is:

1. A process which comprises dissolving a mercaptothiazole in an alkali aqueous solution and then subjecting said solution to the oxidizing action of nitrogen chloride whereby to precipitate the disulfide of the mercaptothiazole.

2. A process which comprises dissolving a mercapto-arylene-thiazole in an alkali aqueous solution and then subjecting said solution to the oxidation action of nitrogen chloride whereby to precipitate the disulphide of the mercapto-arylene thiazole.

3. A process of preparing dibenzothiazyl disulphide which comprises oxidizing 1-mercaptobenzothiazole, in aqueous alkaline solution, with nitrogen chloride.

4. A process of preparing 1,1-dithio bis-benzothiazole which comprises reacting on a cooled aqueous alkaline solution of 1-mercaptobenzothiazole, with nitrogen chloride.

MORRIS G. SHEPARD.
WILLIAM E. MESSER.